UNITED STATES PATENT OFFICE.

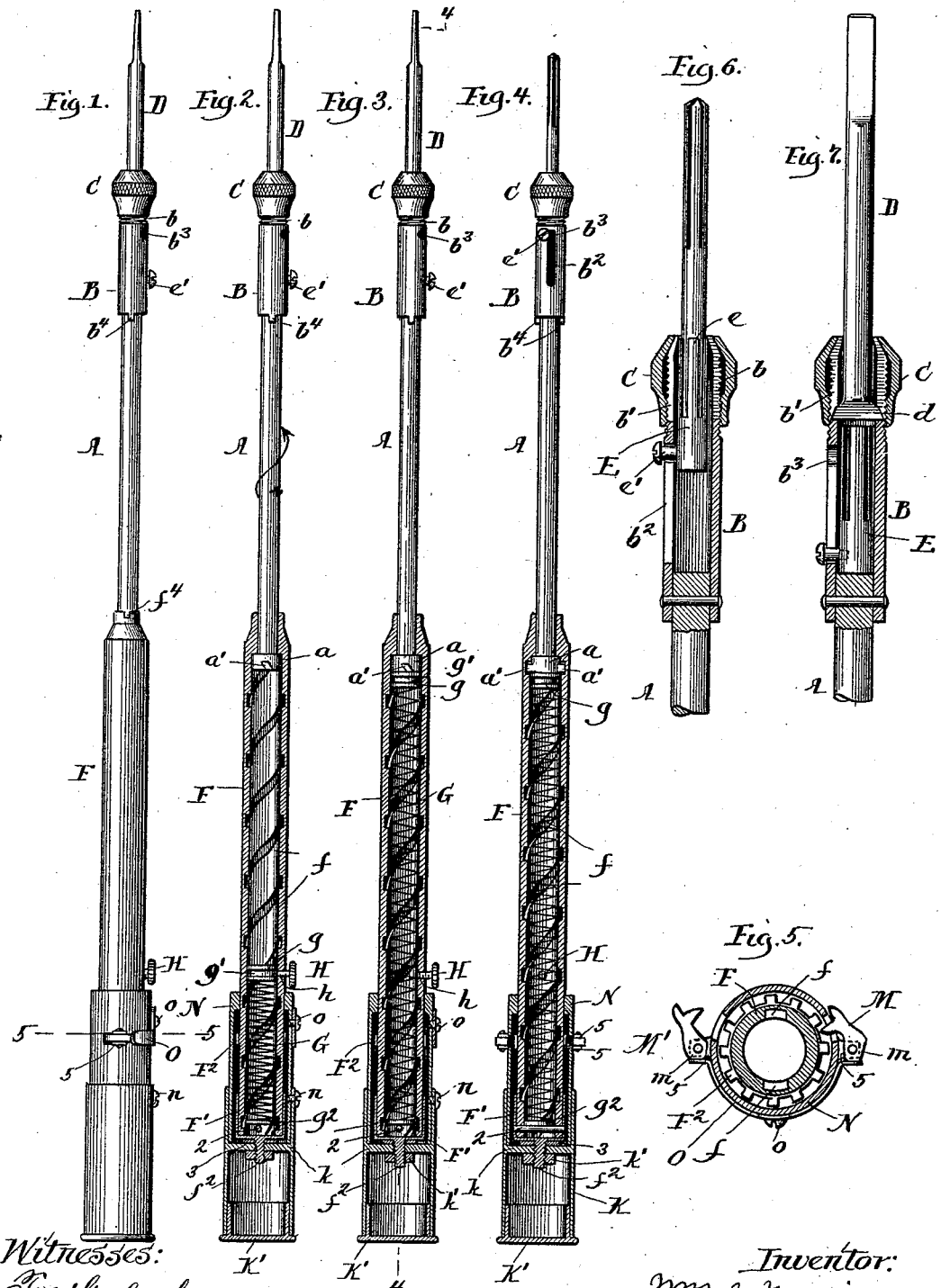

WILLIAM J. MORRISON, OF CHICAGO, ILLINOIS.

COMBINATION TOOL-HANDLE.

SPECIFICATION forming part of Letters Patent No. 528,731, dated November 6, 1894.

Application filed February 24, 1894. Serial No. 501,328. (No model.)

*To all whom it may concern:*

Be it known that I, WILLIAM J. MORRISON, a citizen of the United States, residing at Chicago, county of Cook, and State of Illinois, have invented certain new and useful Improvements in Combination Tool-Handles, of which I do declare the following to be a full, clear, and exact description, reference being had to the accompanying drawings, forming part of this specification.

My present invention has for its object to provide an improved construction of tool handle which shall be simple, cheap and durable and which will be susceptible of imparting a variety of movemements to the tools in connection with which the handle is designed to be used.

A further object of my invention is to provide an improved construction of chuck whereby bits of different sizes can be readily held.

My invention consists in the various novel features of construction hereinafter described, illustrated in the accompanying drawings, and particularly pointed out in the claims at the end of this specification.

Figure 1 is a view in side elevation of my improved tool-handle and chuck. Fig. 2 is a view in central vertical section through Fig. 1, the operating spring being shown in retracted position. Fig. 3 is a view similar to Fig. 2 but showing the spring in position for action. Fig. 4 is a view in central vertical section through the body of the handle, this section being taken upon line 4—4 of Fig. 3, the chuck being shown as provided with a drill. Fig. 5 is an enlarged view in cross section on line 5—5 of Fig. 1. Fig. 6 is an enlarged detail view in vertical section through the chuck. Fig. 7 is a view similar to Fig. 6 but showing the sliding tool holder of the chuck in its retracted position.

A designates the stem or plunger of my improved tool handle, this stem or plunger carrying at its outer end a chuck comprising a hollow head B that is provided with the usual clamp nut C, this nut C having its interior furnished with a threaded portion to engage the corresponding threads $b$ upon the end of the head B. The upper end of the head B is formed with the slots $b'$ and preferably the upper end of this head B has its edges beveled to engage the beveled inner face of the clamp nut C. Thus it will be seen that when a bit or tool such for example as a screw-driver D having a shank of large size is to be used, the flattened end $d$ of this bit or tool D will be placed within opposite slots $b'$ of the head B and the jam-nut C will then be screwed downward so as to cause the ends of the head B to tightly bind against the body of the bit D as shown in Fig. 7 of the drawings.

Within the head B is mounted in manner free to slide the tool holder E, the upper end of which is slotted so as to form arms $e$ adapted to receive the shank of a bit or tool that is too small to be grasped and held by the ends of the head B. To the sliding tool holder E is connected a pin $e'$ that projects through a slot $b^2$ formed in the head B, this slot having an angular portion $b^3$ forming a "bayonet joint slot" wherein the pin $e'$ will move. Hence it will be seen that if a bit or tool having a small shank is to be held, the shank of this bit or tool will be inserted between the arms $e$ of the tool holder E while the tool holder is in the retracted position shown in Fig. 7, after which the tool holder E will be moved to the position shown in Figs. 4 and 6, bringing the free ends of its arms $e$ into position to be engaged by the arms of the head B when the jam-nut C is screwed downward upon the head B, and by this means the small bit or tool can be firmly held within the chuck. It will thus be seen that by my improved chuck I can readily hold bits or tools of a great variety of sizes which it would be impossible to hold in a chuck of ordinary construction.

The stem or plunger A of my improved tool handle has its headed end $a$ within the tubular shell or casing F that is provided with the spiral grooves $f$ that receive the lugs $a'$ projecting from the head $a$ of the stem A. This tubular shell F is shown as containing a coil spring G that serves, when in use, to force the stem or plunger A normally outward as shown by Fig. 3 in the drawings. The spring G has at one end a bearing plate $g$ preferably formed with a groove $g'$, and at the opposite end of this spring is preferably provided a bearing plate $g^2$ that rests against a pin 2 projecting through the shell F as shown in Fig. 4. When the spring G is to be thrown out of action (as will hereinafter more fully appear), it will be compressed by an inward movement of the stem or plunger A, and when in its compressed position, a set-screw H that passes through a threaded hole $h$ in the shell F will enter the groove $g'$ of the bearing block $g$ and thus retain this spring in the retracted position shown by Fig. 2 of the drawings. It is obvious that instead of a set-screw H, a pin or pawl of any suitable construction might be employed to retain the spring in its retracted position. The shell F is preferably provided at its inner end with a cap F' from which extends a stem $f^2$ that passes through a division plate $k$ of the handle K, a nut $k'$ engaging the stem $f^2$ and serving to hold the shell F in proper relation with respect to the handle K. Preferably a washer 3 is interposed between the cap F' of the shell or casing F, and the plate $k$ of the handle K, although this is not essential. The outer surface of the shell F is provided with a series of teeth or cogs $F^2$ (see Fig. 5) adapted to be engaged by the pawls M and M' pivotally connected to the lugs 5 that project from the face of a sleeve or casing N, the upper end of which is held between the handle or casing K and the shell F. The handle K is by preference formed separate from the sleeve N and is connected thereto by means of a screw $n$ as shown in Figs. 2 and 3 of the drawings. The pawls or dogs M and M' are preferably provided with the eccentric ends $m$ that are engaged by the free ends of the spring plate O, the ends of this plate serving to hold the dogs M and M' either in a retracted position or in engagement with the cogs $F^2$ as seen in Fig. 5. The spring plate O is suitably held upon the sleeve or casing N by means of a screw $o$ as shown in Figs. 1 and 5 of the drawings. The handle K is shown as provided with a cap K' which can be removed when access is to be had to the nut $k'$.

From the foregoing description it will be seen that when the handle K is depressed, thereby forcing the stem or plunger A to pass upward into the shell F, the stem or plunger A will have a movement of revolution imparted thereto, if the shell F be held stationary, by reason of the travel of the pins or lugs $a'$ within the spiral grooves of the shell F. It will also be seen that the shell F is pivotally connected to the handle K, by the stem $f^2$ and the shell F is locked against rotation only when one or both of the dogs or pawls M and M' are in engagement with the cogs $F^2$ upon the exterior of the shell F. If therefore, my improved tool handle is to be used for a screw-driver, the spring G can be set in the retracted position shown in Fig. 2 and the pawl or dog M can be thrown into engagement with the cogs $F^2$ as shown in Fig. 5. When the pawl or the dog M thus engages the cogs $F^2$, it will permit the rotation of the shell F in one direction but will lock it against rotation in the opposite direction. Hence it will be seen that when this pawl M engages the cogs $F^2$ (the pawl M' being assumed to be out of action as seen in Fig. 5), and the handle K is forced toward the chuck the stem or plunger A will be caused to revolve in the direction of the arrow, Fig. 2. If the handle K is now retracted (the chuck being held by one hand of the operator against backward movement), the stem or plunger A will not revolve backward because the shell F is free to revolve in backward direction with respect to the handle K, because the pawl or dog M' is not in engagement with the cogs $F^2$. With the pawl M in engagement with the cogs $F^2$ the driving of screws can be readily effected. If it is desired to withdraw screws, then the pawl M will be disengaged from the cogs $F^2$ and the pawl M' will be thrown into engagement with its cogs, thus permitting the handle K to move toward the chuck without rotating the bit or tool, but as the handle K is retracted the tool will be forced to revolve in backward direction and thereby withdraw the screw.

It will be understood of course that when necessary the chuck will be held by one hand of the operator against backward movement as the tool is operated.

When it is desired to drive or withdraw screws that are in an overhead position, the spring G will be restored to the position seen in Fig. 3 of the drawings, so as to permit the spring to force the stem or plunger A normally outward as there shown. One or the other of the pawls M or M' will then be brought into engagement with the cogs $F^2$ according as it is desired to drive or withdraw the screws; and it will be seen that when the spring G is thus in action it will enable overhead screws to thus be driven or withdrawn which would be quite impossible with instruments of this character in which no spring is employed for normally forcing out the stem or plunger A, since the spring by thus forcing out the stem or plunger, serves to hold the bit or tool D in engagement with the head of the screw as the handle is retracted. So far as I am aware my invention presents the first instance of a screw-driver of this character by means of which overhead screws can be driven or withdrawn.

By providing means for throwing the spring out of action it is manifest that the tool can be used in ordinary screw-driver work without the necessity of the operator expending his strength in working against the force of the spring while at the same time the spring is held in position to enable the tool to be instantly used for overhead screw-driver work or for the purposes of a drill.

When the instrument is to be used for drilling purposes the spring G will be in the position shown in Fig. 4 of the drawings, thereby serving to thrust the stem or plunger A normally outward and at such time both the pawls M and M' will ordinarily be in engagement with the cogs $F^2$, thereby serving to turn the drill in both directions as the handle K is moved toward and from the chuck. If however, a gimlet or the like is used in the chuck head, one of the pawls M only will be engaged with the cogs F² so that a revolution of the gimlet will occur on the forward movement only of the handle K. It will be observed that the end of the shell F is provided with the notches f⁴ with which will engage the lugs b⁴ that project from the inner end of the hollow head B and when the stem or plunger A is forced inward to the extreme of its movement and the lugs b⁴ are in engagement with the notches f⁴, the tool D can be turned positively either in backward or forward direction.

Having thus described my invention, what I claim as new, and desire to secure by Letters Patent, is—

1. A tool comprising the combination with a stem or plunger and with a shell or casing wherein said stem or plunger slides provided with means whereby revolution may be imparted thereto, of a spring for forcing said stem or plunger outward and means for holding said spring out of action, substantially as described.

2. A tool comprising the combination of a stem or plunger, a shell or casing wherein said stem or plunger slides and whereby revolution may be imparted thereto, a handle, suitable dogs and cogs for locking said shell against revolution, a coil spring within said shell and serving to force said stem or plunger outward and suitable means carried by said shell for holding said coil spring in retracted position, substantially as described.

3. A tool comprising the combination of a stem A provided with a chuck at one end, a shell F wherein the opposite end of said stem is held in manner permitting it to reciprocate and rotate, said shell having its inner end provided with a cap and having its exterior provided with ratchet teeth, an open ended sleeve encircling said shell and provided with pawls to engage said ratchet teeth, a handle revolubly mounted upon the end of said shell and provided with a transverse plate and a pivot bolt extending through said transverse plate and pivotally connecting the handle to the cap of the shell and a nut upon said bolt, substantially as described.

4. A chuck having an exterior and beveled hollow head B provided with compressible ends to engage a bit of large size, an exteriorly threaded and beveled jam nut C to engage and compress said ends a sliding supplemental tool holder within said head B, said supplemental tool holder having jaws to engage a bit of smaller size and means for retaining said supplemental tool holder in position to be compressed by the operation of said jam nut, substantially as described.

5. A chuck comprising a hollow head B, a jam-nut C, mounted upon said hollow head, and a sliding tool holder E, having arms e, said tool holder being mounted within said hollow head and being provided with a suitable shifting bit working within a slot in said hollow head, substantially as described.

WILLIAM J. MORRISON.

Witnesses:
GEO. P. FISHER, Jr.,
FRED GERLACH.